United States Patent

Botsolas

[11] Patent Number: 5,335,697
[45] Date of Patent: Aug. 9, 1994

[54] PIPE INSULATION END CAP

[75] Inventor: Chris J. Botsolas, Clearwater, Fla.

[73] Assignee: Carol M. Botsolas, Clearwater, Fla.

[21] Appl. No.: 782,667

[22] Filed: Oct. 25, 1991

[51] Int. Cl.$^5$ .................................... F16L 58/00
[52] U.S. Cl. ...................................... 138/149; 138/109
[58] Field of Search ............... 138/149, 109; 285/485, 285/47; 137/375; 264/469

[56] References Cited

U.S. PATENT DOCUMENTS

| 2,545,030 | 3/1951 | Isenberg et al. | 138/109 X |
| 2,695,254 | 11/1954 | Isenberg | 138/109 |
| 3,307,590 | 3/1967 | Carlson | 138/149 |
| 3,492,029 | 1/1970 | French et al. | 138/149 X |
| 3,559,660 | 2/1971 | Rollins | 138/149 |
| 3,981,689 | 9/1976 | Trelease | 138/149 |
| 4,477,108 | 10/1984 | Castelbaum et al. | 138/109 |
| 4,522,578 | 6/1985 | Martin, Jr. et al. | 264/46.9 |
| 5,014,752 | 5/1991 | Takenakajima et al. | 138/149 |

FOREIGN PATENT DOCUMENTS

| 2756935 | 7/1978 | Fed. Rep. of Germany | 138/149 |
| 2401192 | 1/1981 | France | 138/109 |
| 54-16768 | 2/1979 | Japan | 138/149 |
| 252198 | 12/1926 | United Kingdom | 138/149 |

Primary Examiner—Frankie L. Stinson
Attorney, Agent, or Firm—Hedman, Gibson & Costigan

[57] ABSTRACT

An assemblage and method for covering the terminal end of an insulated pipe.

5 Claims, 2 Drawing Sheets

PIPE INSULATION END CAP

FIELD OF THE INVENTION

This invention relates to covering for pipe insulation. More specifically, the invention relates to end caps for terminating insulation that covers a pipe.

BACKGROUND OF THE INVENTION

Protection for piping from the elements is necessary in a number of applications. More specifically, pipe insulation, when not covered and protected, is susceptible to water and insect infiltration and deterioration.

When applying insulation to pipes, it is desirable to cover the end portion of the insulation at unions, valves, specialty fittings and the terminal ends of pipes. Finding a satisfactory way to cover the end portion of insulation has been a persistent and long term problem in the pipe insulation industry.

Raw ends of pipe insulation have been covered in various ways including cementing and canvasing, cementing and painting with a mastic coating, or covering the insulation with a thermoformed rigid PVC end cap. Although currently in use, none of these methods are entirely satisfactory for all applications due to the relatively high cost of either labor or the manufacture of materials.

Further, in cases of cementing and canvasing over or painting with mastic coating, the canvas and mastic coating materials tend to shrink and ultimately disintegrate when exposed to high pipe temperatures, weathering, or washdowns.

Ends caps made of PVC have received much attention in recent years. These PVC end caps are shaped over molds made of two sections, each greater than a half circle. The thermoformed cover, therefore, has a slightly ovoid shape. After thermoforming, the PVC end cap is cut through one side and along the centerline of the base, but not through the side opposite to the cut side thereby forming two sections which are connected solely by the side wall which has not been cut. The end cap is then placed over the terminal portion of the insulation and the above-described sections are overlapped until the cover fits securely around the insulated pipe. A PVC end cap of this type has been manufactured by Proto Corp., Clearwater, Fla., and is more fully described in the 1986 product catalog of Proto Corp., page 6.

In light of the limitations of the cited methods, efforts have thus been made to form end caps out of metals, especially soft metals, such as aluminum. These materials offer resistance against deterioration at much higher temperatures than PVC and similar plastics.

However, the drawback to the use of metals is their inability to be drawn in oversized half-sections, as can be done for PVC, without the use of expensive individual dies. For this reason, metal end caps have been made by forming two separate and identical half sections. The two half-sections are then fitted around the insulated pipe and fastened by rivets, screws, etc. Metal end caps of this type and methods of manufacture are described in Holt, U.S. Pat. No. 276,044. Disadvantages associated with such methods include difficulty in fitting and fastening the two half-sections over pipes of small diameters, providing watertight seals and the difficulty for one person to install the cover about the pipe.

A particularly good end cap is described in U.S. Pat. No. 4,869,293 (Botsolas, Sep. 26, 1989) but represents a different and more expensive approach to the termination of insulation than the present invention.

SUMMARY OF THE INVENTION

It is an objective of the present invention to provide a means and method for covering the terminal end of an insulated pipe.

It is another objective of the present invention to provide an inexpensive assemblage of materials and a simplified method of applying the materials to the termination of insulation on a pipe.

The end cap assemblage of materials comprises an essentially flat rigid tape having adhesive on one side, a flat disc configured to be cut to a desired circular size and caulking compound. The disc in one embodiment is formed with a centrally disposed hole, concentrically arranged score lines and one slit extending from the outer edge of the disc to the centrally disposed hole.

Application of the end cap to the termination of insulation on a pipe proceeds by securing the rigid tape to the outer surface of the pipe insulation by the adhesive on one side of the tape, applying caulking compound on the end of the insulation, slightly upsetting the disc into a conical shape and sliding the slightly upset disc over the pipe into engagement with the caulking compound applied to the termination of the insulation, smoothing the caulking that migrates beyond the disc and applying caulking to seal the centrally disposed hole in the disc.

DESCRIPTION OF THE DRAWINGS

The present invention will be better understood when viewed with the following drawings wherein.

DESCRIPTION OF THE PREFERRED EMBODIMENT

The subject invention has application wherever the termination of insulation is necessary. However, the invention will be described in the embodiment of insulation terminating at an intermediate point on the pipe being insulated. In the preferred embodiment the pipe 2 extends beyond the pipe insulation 4 as seen in FIGS. 1-5. The end cap of this invention can be used to cover insulation that extends to the termination of piping.

Figure 1:
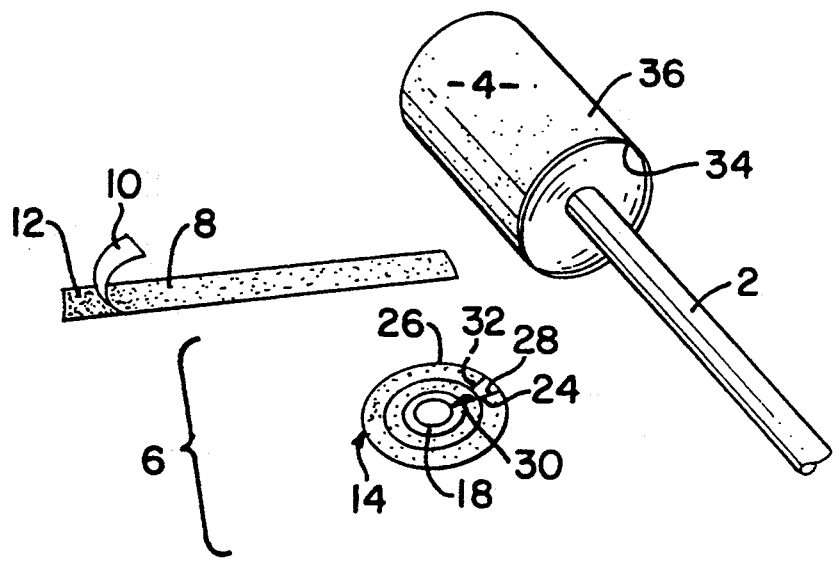
FIG. 1 is an exploded view of the assemblage of materials of the present invention.

As best seen in FIG. 1, the end cap 6 of the invention is comprised of a tape member 8 having an adhesive backing 10 which is typically covered with conventional release paper 12, a disc 14 and caulking compound 16. The disc 14 is shown with a centrally disposed hole 18, concentric score lines 20 and 22 and a slit 24 extending from the outer edge 26 of the disc 14 to the hole 18. The slit 24 creates edges 28 and 30 respectively on the disc 14. In addition, a dotted line 32 is optionally shown as the prescribed location for the edge 28 of the slit 24 to rest when the disc 14 is mounted on the end of insulation 4.

FIG. 1 shows a conventional pipe 2 on which conventional insulation 4, in this case fiberglass, is attached. The raw end 34 of the insulation 4 is exposed.

Figure 2:
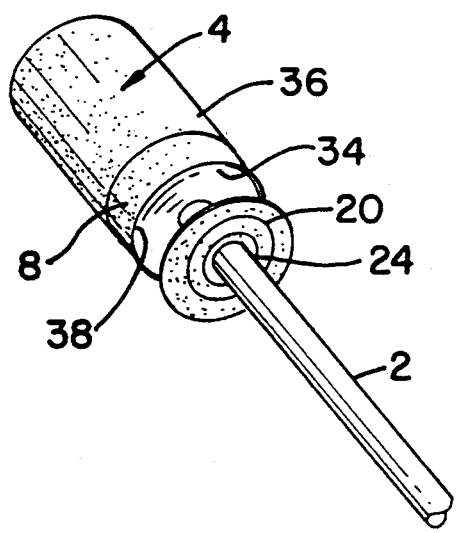
FIG. 2 is an isometric view of an initial step in securing the materials to the end of pipe insulation.
Figure 3:
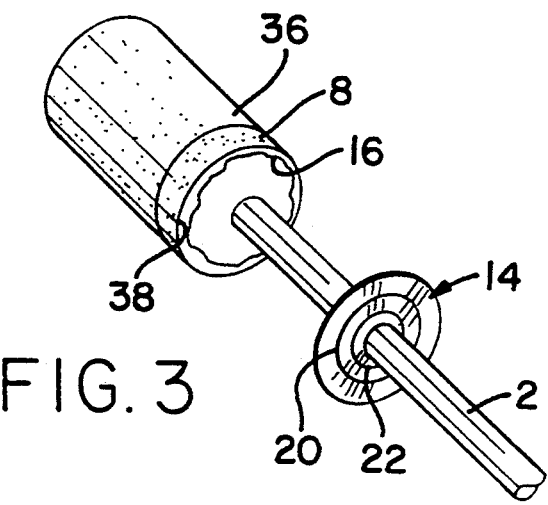
FIG. 3 is an isometric view of a further step in the procedure for securing the assemblage of materials to the end of the pipe insulation.

As best seen in FIG. 2 the release paper 12 is removed from the tape 8 and the tape 8 is secured to outer surface 36 of the terminal end of the pipe insulation 4. The disc 14 is sized to be slightly larger; i.e. ⅛ inch larger than the diameter defined by the inner edge 38 of the tape 8 on the outer surface 36 of the pipe insulation 4. Caulking compound 16 is applied to the raw end 34 of the insulation 4 within the area defined by the inner edge 38 of the tape 8. The disc 14 is upset slightly to reduce the diameter of the outer edge 26 of the disc 14 to fit snugly within the area defined by the inner edge 38 of the tape 8. The disc 14 is upset slightly by overlapping edge 28 of the slit 24 over the edge 30 of the slit 24 and securing the overlap to the surface of the disc 14 by any conventional adhesive.

Figure 4:
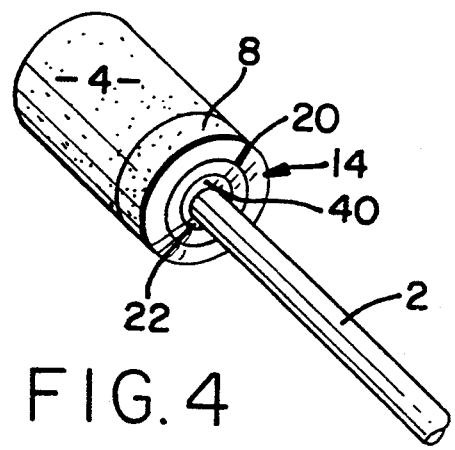
FIG. 4 is an isometric view similar to FIG. 3 showing the disc secured to the pipe insulation.

As seen in FIG. 4, the disc 14, due to the upset, is formed with a slightly conical surface to effect water shedding and provide a secure fit against the inner edge 38 of the tape 8. Disc 14 also contains concentric circular score lines 20 and 22 which serve as cutting guides. These cutting guides allow the hole 18 in disc 14 to be sized to accommodate the outer diameter of the pipe 2 being insulated and also to size the disc 14 to cover the area defined by the inner edge 38 of the tape 8.

In a preferred embodiment, the disc 14 contains concentric circular score lines 20 and 22 which are deep enough to allow for tearing along the score line after being started by a pair of snips or other similar cutting instruments.

The hole 18 in disc 14 should be slightly larger than the outer diameter of the pipe 2 to prevent direct contact between the disc 14 and the pipe 2. This will prevent puckering of the disc due to its contact with the pipe 2.

Figure 5:
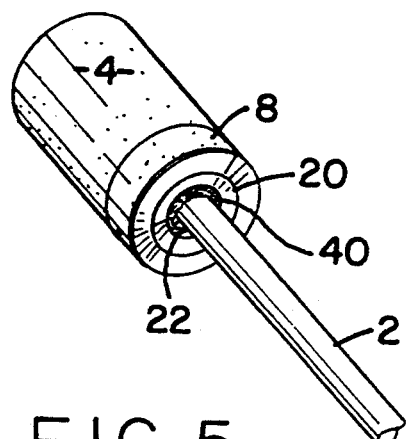
FIG. 5 is an isometric view similar to FIG. 4 showing the completed end cap covering the pipe insulation.

The final step of securing the end cap 6 is shown in FIG. 5 by the application of caulking compound to seal the opening 40 between the hole 18 in the disc 14 and the pipe 2.

Typically, the disc 14 will be formed of polyvinyl chloride at essentially a minimum thickness of 0.005 inches. Practice has shown that the practical maximum thickness of the disc 14 is about 0.0625 inches thick. Practice has also shown that the most practical thickness for the range of sizes would be from 0.005 inches for very small end cap diameters where a vapor barrier is not required to 0.035 inches thickness where a positive vapor barrier is required. If VINALUM (a vinyl aluminum composite) is used, a thickness of 0.002 inches will provide a suitable vapor barrier. Other materials such as stiff plastic or composite materials such as high temperature sheet gasketing material may be used for the disc 14.

In another embodiment, pure aluminum can also be used at a thickness of 0.005 to 0.050 inches for the tape 8 or the disc 14.

An illustrative disc 14 is formed of polyvinyl chloride and sized slightly greater than 5½ inches in diameter; i.e. 5⅝ inches to enable the slight upset necessary to provide the conical shape when the slit edge 28 of the disc 14 overlaps the slit edge 30 for insertion on the pipe 2. Pipe insulation is manufactured in many thicknesses depending on the efficiency desired and is made in standard outer diameter sizes, that will nest over each other for additional thicknesses. For example, pipe insulation with an outer diameter of 5½ inches can be obtained by applying ½ inch insulation to a 4½ inch outer diameter pipe, 1¼ inch insulation to a 3 inch outer diameter pipe or 2¼ inch insulation to a 1 inch outer diameter pipe. Therefore, a 5⅝ disc with concentrically arranged score lines would fit each pipe size with an insulation outer diameter of 5½ inches.

The tape 8 that functions best in the environment of the end cap 6 of the invention is an adhesive backed rigid polyvinyl chloride tape or strip 0.010 to 1/16 inch thick capable of being deflected into a circular shape and adhered to itself.

In the embodiment of the end cap wherein the insulation extends to the termination of the piping, the disc 14 will have either a very small hole 18 or none at all. The hole can be sealed with caulk sealant. Where no hole is made the flat disc will have an outside diameter equal to the outside diameter of the pipe insulation.

I claim:

1. A method for sealing an end of an insulated pipe comprising the steps of:
    (a) applying tape around the outer surface of the insulation at the terminal end of the insulation;
    (b) upsetting a disc having a slit extending from the edge of the disc to the center to reduce the outside diameter of the disc to approximately correspond with the area defined by the inner edge of the tape surrounding the outer surface of the terminal end of the insulation;
    (c) securing caulking compound to the terminal end of the insulation; and
    (d) securing the end cap to the caulking compound whereby the outer edge of the disc bears against the inner edge of the tape.

2. A method as in claim 1 further comprising the steps of smoothing the caulking that migrates beyond the tape and outer edge of the disc and applying caulking compound to openings on the disc.

3. A method as in claim 1 further comprising the step of upsetting the disc to provide a conical shape.

4. A method as in claim 1, wherein the disc includes a plurality of concentrically disposed score lines and further comprising the step of tearing the disc along a concentric circular score line for sizing a hole in the disc to accommodate the insulated pipe or for sizing the disc to accommodate the outside diameter of the pipe insulation.

5. A method as recited in claim 1, wherein the tearing step is initiated by cutting a portion of the concentric circular score line.

* * * * *